United States Patent
Lee

(10) Patent No.: US 6,351,637 B1
(45) Date of Patent: Feb. 26, 2002

(54) METHOD OF TRANSMITTING A CALLER'S IDENTIFICATION NUMBER TO A MOBILE INSTRUMENT FROM A HOME BASE STATION

(75) Inventor: Sang-Seo Lee, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/317,319

(22) Filed: May 24, 1999

(30) Foreign Application Priority Data

May 23, 1998 (KR) ............................................. 98-18715

(51) Int. Cl.$^7$ ................................................ H04Q 7/32
(52) U.S. Cl. ...................................... 455/415; 455/414
(58) Field of Search .................................. 455/414, 415, 455/428, 433, 465, 445, 426; 379/82.21, 82.19, 82.23, 82.25

(56) References Cited

U.S. PATENT DOCUMENTS

| | | | |
|---|---|---|---|
| 3,133,848 A | * 5/1964 | Kudoh ................... | 340/825.44 |
| 5,703,934 A | * 12/1997 | Zicker et al. ............... | 455/462 |
| 5,920,815 A | * 7/1999 | Akhavan .................... | 455/426 |
| 6,049,718 A | * 4/2000 | Steward ....................... | 455/456 |
| 6,052,592 A | * 4/2000 | Schellinger et al. ........ | 455/445 |
| 6,084,951 A | * 7/2000 | Smith et al. ............. | 379/93.17 |
| 6,122,502 A | * 9/2000 | Grundvig et al. ........... | 455/414 |
| 6,148,213 A | * 11/2000 | Bertocci et al. ............ | 455/462 |

* cited by examiner

Primary Examiner—William Trost
Assistant Examiner—Congvan Tran
(74) Attorney, Agent, or Firm—Dilworth & Barrese, LLP

(57) ABSTRACT

A method of transmitting a caller's ID Number received by a home base station located within a predefined home base station area to a mobile instrument or station set to a cellular phone mode is provided. The method comprises the steps of receiving the caller's ID Number along with a ring signal at the home base station, determining whether the mobile instrument is set to the cellular phone mode, transmitting the caller's ID Number to the mobile instrument if the mobile instrument is set to the cellular phone mode, storing the caller's ID Number in the home base station if the mobile instrument is not set to the cellular phone mode while continuously checking to detect whether the mobile instrument is set to the cellular phone mode and transmitting the caller's ID Number to the mobile instrument after detecting the mobile instrument has been set to the cellular phone mode, setting a flag at the home base station to represent receipt of the caller's ID Number by the mobile instrument, performing communication via the mobile instrument after clearing the flag when the mobile instrument is detected to have changed to a communication mode by receiving the ring signal, determining whether the flag has been set in the home base station if the ring signal is terminated without performing communication, transmitting the caller's ID Number to the mobile instrument set to the cellular phone mode upon detecting the flag, and clearing the flag upon completing the transmission of the caller's ID Number.

5 Claims, 4 Drawing Sheets

METHOD OF TRANSMITTING A CALLER'S IDENTIFICATION NUMBER TO A MOBILE INSTRUMENT FROM A HOME BASE STATION

BACKGROUND

1. Field of the Invention

The present invention relates to a home-based cellular radio/cordless phone system, and in particular to a method of transmitting a caller's identification number received by a home base station to a mobile instrument set to a cellular mode.

2. Description of the Related Art

Generally, a home-based cellular radio/cordless phone system includes a home base station and mobile instrument. The mobile instrument can be switched between a cordless phone mode and a cellular phone mode depending upon the mobile instrument's location with respect to a home base station service area in order to communicate with the home base station. Accordingly, this type of phone system allows one to use the same mobile instrument as a cellular phone for cellular network communications and as a cordless phone for low cost communications via the public switched telephone network (PSTN).

The home base station typically includes the ability to receive a caller's identification number (ID Number) from the PSTN and transmit it to the mobile instrument while in the cordless phone mode. However, this feature may only be performed when the mobile instrument is within the home base station service area. Hence, in order for the mobile instrument to receive the caller's ID Number received by and transmitted from the home base station, the mobile instrument should be within the home base station service area.

For example, as shown in FIG. 1, in a prior art telephone system, when the mobile instrument or station 110 is within the home base station service area 130 and set to the cordless phone mode, the caller's ID number can be transmitted from public exchange system 100 through PSTN to the home base station 110 and then to the mobile station 120. However, when the mobile station is set to the cellular phone mode, it cannot receive the caller's ID Number.

SUMMARY

Accordingly, it is an object of the present invention to provide a method of transmitting a caller's ID number received by a home base station to a mobile station set to the cellular phone mode.

According to the present invention, a method of transmitting a caller's ID Number received by a home base station located within a predefined home base station area to a mobile instrument or station set to a cellular phone mode is provided. The method comprises the steps of receiving the caller's ID Number along with a ring signal at the home base station, determining whether the mobile instrument is set to the cellular phone mode, transmitting the caller's ID Number to the mobile instrument if the mobile instrument is set to the cellular phone mode, storing the caller's ID Number in the home base station if the mobile instrument is not set to the cellular phone mode while continuously checking to detect whether the mobile instrument is set to the cellular phone mode and transmitting the caller's ID Number to the mobile instrument after detecting the mobile instrument has been set to the cellular phone mode, setting a flag at the home base station to represent receipt of the caller's ID Number by the mobile instrument, performing communication via the mobile instrument after clearing the flag when the mobile instrument is detected to have changed to a communication mode by receiving the ring signal, determining whether the flag has been set in the home base station if the ring signal is terminated without performing communication, transmitting the caller's ID Number to the mobile instrument set to the cellular phone mode upon detecting the flag, and clearing the flag upon completing the transmission of the caller's ID Number.

DETAILED DESCRIPTION OF PREFERRED EMBODIMENTS

Figure 1:
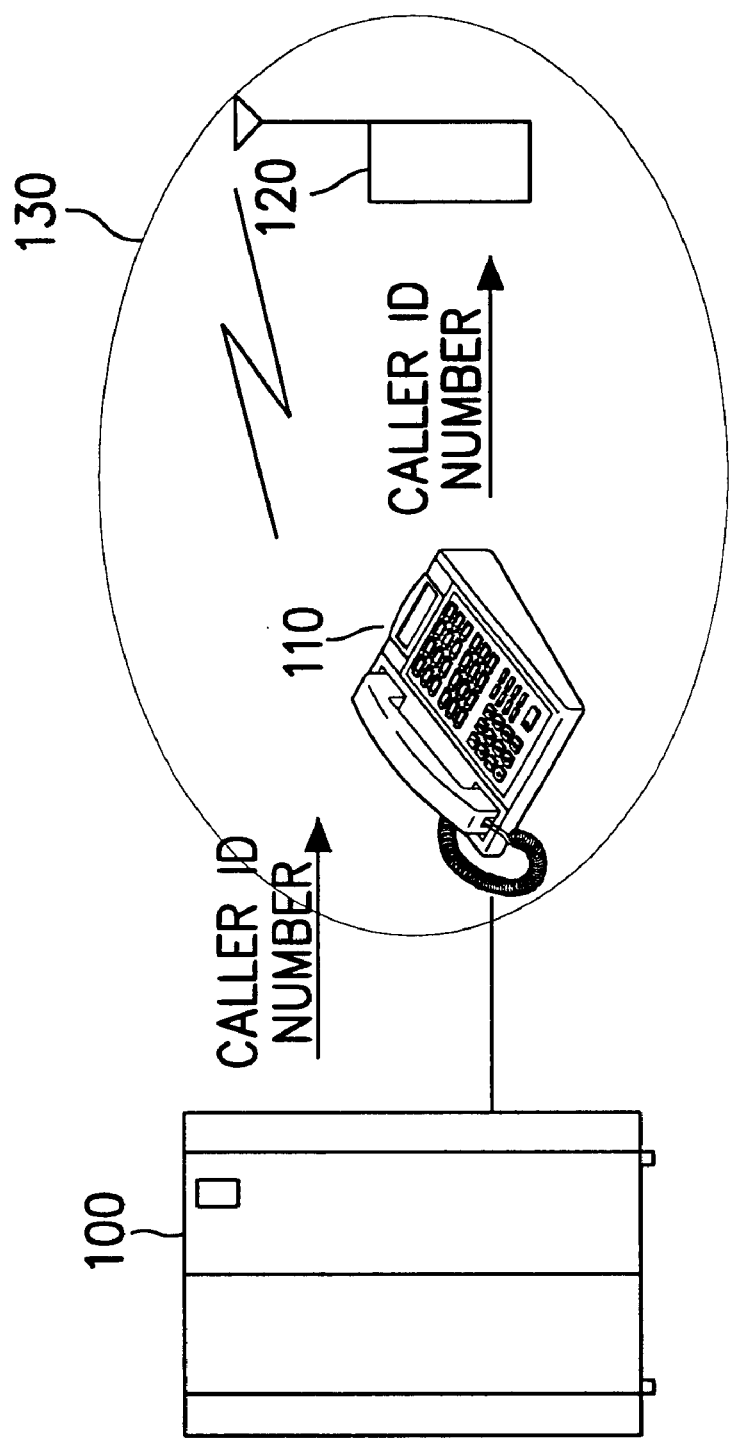
FIG. 1 is a block diagram illustrating a prior art telephone system for transmitting a caller's ID Number received by a home base station to a mobile station.

It is to be understood that in the following description of preferred embodiments, specific details are set forth to provide a more thorough understanding of the present invention, notwithstanding that one skilled in the art may practice the invention without these specific details. It is to be further understood that in the accompanying drawings, similar reference numerals are used to denote elements having similar or equivalent constructions. In the following description, well known functions or constructions may not be described in detail since they would obscure the invention in unnecessary detail.

Figure 2:
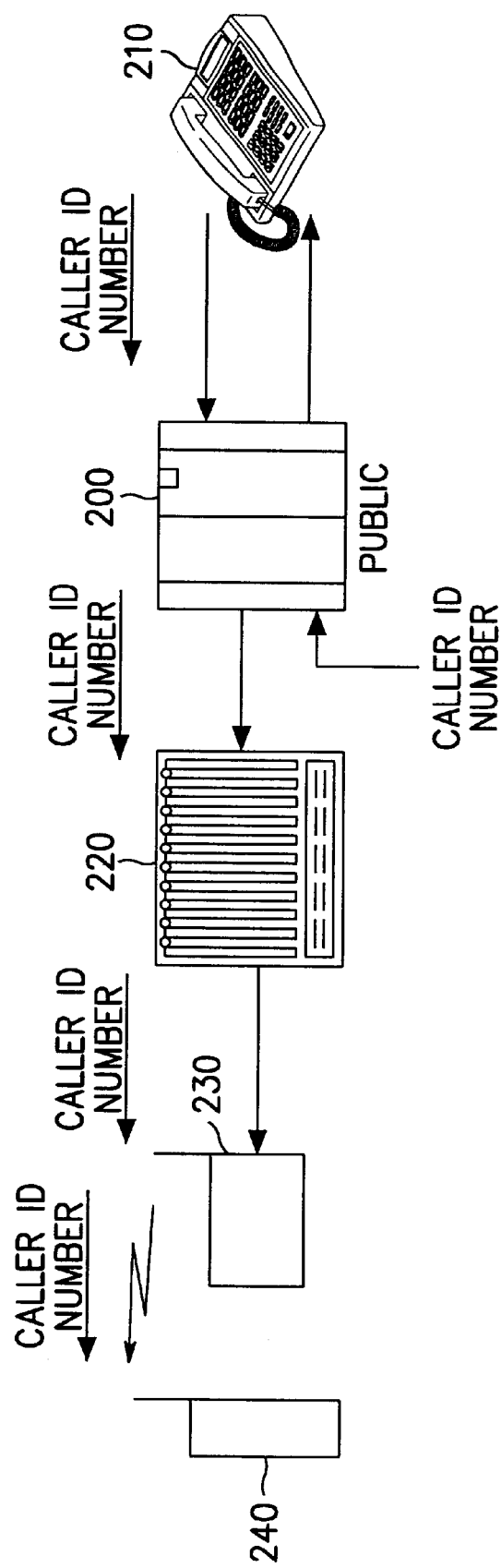
FIG. 2 is a block diagram illustrating a method of transmitting a caller's ID Number received by a home base station to a mobile station set to the cellular mode according to the present invention.

With reference to FIG. 2, there is shown a telephone system for practicing the method of the present invention. The telephone system includes a public switching system 200, home base station 210, mobile switching center (MSC) 220, cellular base station 230, and mobile station 240 set to the cellular phone mode. A caller's ID Number is transmitted from the public switching system 200 to the home base station 210 then to the mobile station set to the cellular phone mode. MSC 220 provides voice mail service together with short message service. The voice mail service is provided by a voice mail system to store caller's voices, which are retrieved by a subscriber. The short message service is to inform in characters the mobile station of news such as stock prices, sports, weather, etc.

Figure 3:
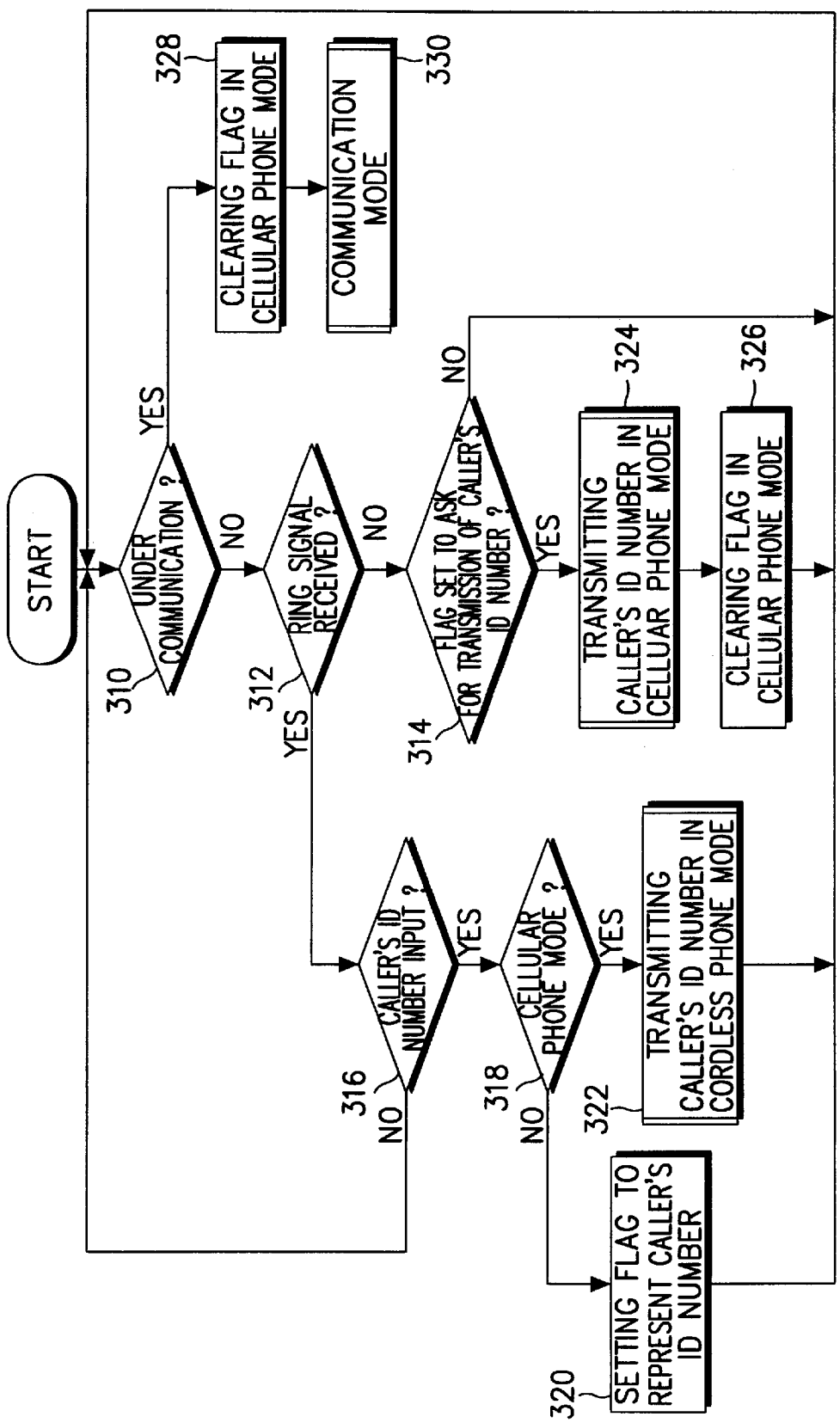
FIG. 3 is a flow chart illustrating the method of transmitting the caller's ID Number to the mobile station according to the present invention.

When a wireline or wireless telephone subscriber calls another's home base station, the public switching system 200 transmits the caller's ID Number to the home base station 210 together with a ring signal. The ID Number is carried during the blank intervals between the ringing intervals of the ring signal. Then, the home base station 210 executes steps 310 to 314, as shown in FIG. 3, to determine whether the mobile station 240 is under communication, receives the ring signal, or a flag has been set to ask the home base station 210 for transmission of the caller's ID number to the mobile station 240 set to the cellular mode during the idle time.

After the home base station 216 receives the ring signal from the public switching system 200 in step 312, the process proceeds to step 316 where ringing sounds are generated. Subsequently, in step 316, the home base station 210 detects the caller's ID Number input from the public switching system 200. If not detected, the process returns to step 310 to determine whether the mobile station 240 has changed to a communication mode by a user responding to the ring signal. Hence, steps 310 to 316 serve as a single subroutine, and thus, if the caller cancels the call, the subroutine is terminated.

On the contrary, if in step 316, the caller's ID Number is detected, the process proceeds to step 318 to determine whether the mobile station 240 is set to a cordless phone mode by communicating periodically with it, as is well known in this art. When the mobile station 240 is set to the cordless phone mode, the home base station 210 transmits the caller's ID Number to the mobile station 240, and the process returns to step 310 to determine whether the mobile station is under communication by receiving the ring signal.

However, if in step 318, the mobile station 240 is detected to be in the cellular phone mode, the process proceeds to step 320 to set the flag to represent the caller's ID Number. This determines whether the caller's ID Number is transmitted to the mobile station 240. Although not shown in the drawings, the caller's ID Number and flag are mapped onto a table, as shown by Table 1, stored in a memory within the home base station 210.

TABLE 1

| INDEX | Caller's ID Number | Flag |
|-------|-------------------|------|
| 1 | 02-987-6543 | 0 |
| 2 | 0343-123-4567 | 0 |
| 3 | 051-456-7890 | 1 |

In Table 1, it is noted that for simplicity purposes, the column indicating the caller's ID Numbers only shows the caller's phone numbers. It is contemplated that other data can be included in this column, such as the caller's name.

After setting the flag in step 320, the process returns to step 310 to determine whether the mobile station is under communication. Detecting the communication mode in step 310, the home base station 210 clears the flag set in the memory in step 328, because the caller's ID Number does not need to be transmitted to the mobile station 240. Subsequently, the process proceeds to step 330 to set the mobile station 240 to perform communication.

However, when the mobile station is not under communication in step 310 or the ring signal is terminated in step 312 by the caller, the process proceeds to step 314 to search the memory map as shown in Table 1 in order to determine whether the flag is set. If the flag is not detected, the home base station 210 is placed in standby, and initial steps 310 to 314 are re-performed to determine if the caller's ID Number needs to be transmitted. If the flag is detected in step 314, the process returns to step 324 to transmit the caller's ID Number to the mobile station 240 set to the cellular phone mode.

Referring back to FIG. 2, a description will now be given regarding the transmission of the caller's ID Number. First, the home base station 210 dials the phone number to call the mobile station 240 by means of the public switching system 200 through PSTN. The phone number may be stored into the home base station 210 by the user. This causes the public switching system 200 to transmit the caller's ID Number through MSC 220 to the cellular base station 230 and in turn to the mobile station 240.

Figure 4:
FIG. 4 illustrates the structure of a data format used in transmitting a caller's ID Number from the home base station to the mobile station.

The caller's ID Number is converted into data format as shown in FIG. 4. The data format is composed of various regions including the region to store the caller's phone number. The regions of the data format according to the present invention include type field (T1T2) distinguishing the type of data format, digital color code region (DCC), message length region (MSL) loading the information (by the number of 32) to represent the length of the message to be sent, message type region (MST) loading the information to distinguish the message type, such as voice mail, short message, call line identifier, etc., digit region (calling party digits) for storing the caller's phone number, etc.

The dialed phone number is registered or stored in the home base station 210. The home base station 210 transmits the caller's ID Number to the mobile station 240 regardless of whether the mobile station 240 answers, because MSC 220 is designed to provide voice mail and short message services by waiting until the mobile station 240 becomes ready upon the termination of a communication link or upon the return of the user of the mobile station 240 to the serviceable or home area from a nonserviceable area. Accordingly, MSC 220 determines whether the mobile station 240 responds or answers to the calling.

If a response is detected from the mobile station 240, MSC 220 converts the data received from the home base station 210 into characters or voices and transmits the same to the mobile station 240. At this time, it also transmits from the home base station 210 the caller's ID Number set in a given region of the data format. If a response is not detected from the mobile station 240, MSC 220 continuous to call periodically until a response is received.

After receiving the caller's ID Number, the mobile station 240 performs the same steps as in the cordless phone mode, i.e., among other things, the mobile station 240 displays the caller's phone number corresponding to the caller's ID Number. Thus, the user of the mobile station 240 may identify the caller through the caller's phone number displayed on a display of the mobile station 240. If the mobile station 240 is located outside the base station service area, the mobile station 240 is set to the cellular phone mode.

While the present invention has been described in connection with specific embodiments accompanied by the attached drawings, it will be apparent to those skilled in this art that various changes and modifications may be made thereto without departing from the scope of the present invention.

What is claimed is:

1. A method for performing a caller ID function by transmitting a caller's ID Number to a mobile instrument, comprising the steps of:

receiving the caller's ID Number along with a ring signal at a home base station;

determining whether the mobile instrument is set to a cellular phone mode;

transmitting the caller's ID Number to the mobile instrument if the mobile instrument is set to the cellular phone mode;

storing the caller's ID Number in the home base station if the mobile instrument is not set to the cellular phone mode while continuously checking to detect whether the mobile instrument is set to the cellular phone mode and transmitting the caller's ID Number to the mobile instrument after detecting the mobile instrument has been set to the cellular phone mode;

setting a flag at the home base station to represent receipt of the caller's ID Number by the mobile instrument;

performing communication via the mobile instrument after clearing the flag when the mobile instrument is detected to have changed to a communication mode by receiving the ring signal;

determining whether the flag has been set in the home base station if the ring signal is terminated without performing communication;

transmitting the caller's ID Number to the mobile instrument set to the cellular phone mode upon detecting the flag; and clearing the flag upon completing the transmission of the caller's ID Number.

2. The method according to claim 1, wherein the step of transmitting said caller's ID Number upon detecting said flag comprises the steps of:

dialing a cellular phone number stored in the home base station corresponding to the mobile instrument; and converting said caller's ID Number into a data format suitable for transmission.

3. The method according to claim 2, wherein said data format includes a plurality of regions for transmitting a particular type of data in each of said plurality of regions.

4. The method according to claim 1, wherein said caller's ID Number is received by said home base station from a public switching system.

5. A method for performing a caller ID function by transmitting a caller's ID Number to a mobile instrument, comprising the steps of:

receiving the caller's ID Number along with a ring signal at the home base station;

determining whether the mobile instrument is set to a cellular phone mode;

transmitting the caller's ID Number to the mobile instrument if the mobile instrument is set to the cellular phone mode;

storing the caller's ID Number in the home base station if the mobile instrument is not set to the cellular phone mode while continuously checking to detect whether the mobile instrument is set to the cellular phone mode and transmitting the caller's ID Number to the mobile instrument after detecting the mobile instrument has been set to the cellular phone mode;

setting a flag at the home base station to represent receipt of the caller's ID Number by the mobile instrument;

transmitting the caller's ID Number to the mobile instrument set to the cellular phone mode upon detecting the flag; and clearing the flag upon completing the transmission of the caller's ID Number.

* * * * *